United States Patent
Sato et al.

(10) Patent No.: US 6,210,797 B1
(45) Date of Patent: Apr. 3, 2001

(54) AIRBAG STORING CASING

(75) Inventors: Izumi Sato, Fujinomiya; Tomokazu Sugiyama, Fuji; Tatsuo Hamanaka; Hiroshi Ooyama, both of Ichihara, all of (JP)

(73) Assignees: Nihon Plast Co., Ltd.; Sumitomo Chemical Company, Ltd., both of (JP)

( * ) Notice: Subject to any disclaimer, the term of this patent is extended or adjusted under 35 U.S.C. 154(b) by 0 days.

(21) Appl. No.: 09/231,557

(22) Filed: Jan. 14, 1999

(30) Foreign Application Priority Data

Jan. 21, 1998 (JP) .................................................. 10-009683

(51) Int. Cl.$^7$ .................................................. B60R 21/16
(52) U.S. Cl. .................. 428/357; 428/35.2; 428/141; 428/156; 280/731; 280/728.3
(58) Field of Search .................... 428/141, 156, 428/35.2, 35.7; 280/731, 728.3; 524/230, 232 A, 525, 526; 525/191, 194, 193

(56) References Cited

U.S. PATENT DOCUMENTS

| | | | | |
|---|---|---|---|---|
| 5,292,791 | * | 3/1994 | Groepper et al. | 524/530 |
| 5,308,699 | * | 5/1994 | Hikasa et al. | 428/402 |
| 5,308,700 | * | 5/1994 | Hikasa et al. | 428/402 |
| 5,326,627 | * | 7/1994 | Yazaki et al. | 428/216 |
| 5,532,055 | * | 7/1996 | Igarashi et al. | 428/318.6 |
| 5,585,431 | * | 12/1996 | Igarashi et al. | 524/425 |
| 5,611,565 | | 3/1997 | Inaba et al. | 280/728.3 |
| 5,691,017 | | 11/1997 | Inaba et al. | 428/35.7 |
| 5,717,036 | * | 2/1998 | Saito et al. | 525/326.3 |
| 5,756,573 | * | 5/1998 | Trumbo et al. | 524/458 |
| 5,947,511 | * | 9/1999 | Usui et al. | 280/728.3 |
| 6,048,942 | * | 4/2000 | Buehler et al. | 525/240 |

\* cited by examiner

*Primary Examiner*—Ellis Robinson
*Assistant Examiner*—Alicia Chevalier
(74) *Attorney, Agent, or Firm*—Kilpatrick Stockton

(57) ABSTRACT

Disclosed is a casing for storing an airbag for an airbag restraint system, cavingg: a main body formed of a material comprising a thermoplastic elastomer composition which is prepared by: mixing 100 parts by weight of a copolymer composition with 0.05 to 0.5 parts by weight of a lubricant comprising higher fatty acid amide to obtain a mixture; and dynamically heat-treating the mixture in the presence of an organic peroxide and an auxiliary crosslinking agent. The copolymer composition contains: (A) 20 to 50 parts by weight of an olefin copolymer resin of propylene and one or two kinds of 1-olefin other than propylene; (B) 10 to 50 parts by weight of ethylene-propylene copolymer rubber having a Mooney viscosity ($ML_{1+4}$, 100° C.) ranging from 30 to 60; (C) 10 to 70 parts by weight of ethylene-propylene-nonconjugated diene copolymer rubber having a Mooney viscosity ($ML_{1+4}$, 100° C.) ranging from 50 to 100; and (D) 10 to 50 parts by weight of an oil-extended ethylene-propylene-nonconjugated diene copolymer rubber containing ethylene-propylene-nonconjugated diene copolymer having a Mooney viscosity ($ML_{1+4}$, 100° C.) ranging from 150 to 350 and a mineral oil softener contained at an amount of 50 to 150 parts by weight relative to 100 parts by weight of the ethylene-propylene-nonconjugated diene copolymer.

18 Claims, 2 Drawing Sheets

AIRBAG STORING CASING

BACKGROUND OF THE INVENTION

1. Field of the Invention

The present invention relates to improvements of a casing for storing an airbag of an airbag restraint system which casing is adapted to b e deployed under the influence of high pressure gas from an inflator which is operated in response to impact at a vehicle collision or the like.

2. Description of the Prior Art

Conventionally, a variety of casings for storing an airbag have been known, in which polyurethane foam is used as its material in order to provide a soft feeling to the skin layer part of the casing which part constitutes an interior part of a vehicle. In these casings, a hard resin material or a net-like fibrous reinforcing material is used as a core layer in the casing in order that the casing tears only along a predetermined tearing line (a thin wall part) when the airbag operates as disclosed, for example, in Japanese Patent Laid-Open No. 63-232052.

However, drawbacks have been encountered in these casings, in which the casings are of a multi-layer structure and therefore is complicated in its fabrication process thereby lowering a yield or productivity and having a tendency that an unevenness is formed at the surface owing to an insert and a core layer used. Additionally, the casing in which the fibrous reinforcing material is inserted therein has a problem that the fibrous reinforcing material tends to shift in location during fabrication because of a low rigidity of the fibrous reinforcing material.

From viewpoints of solving this problem and lowering a production cost, it has been proposed to produce the airbag storing casing of a thermoplastic elastomer by an injection molding without using the above-mentioned insert, as disclosed, for example, in Japanese Patent Laid-Open No. 2-171364.

However, the thus produced casing has a thin wall section at its tearing portion of a lid member. Besides, the casing is in a structure in which the wall thickness continuously increases form the thin wall section of the tearing portion, so that the area of a thin wall is large.

As a result, this thin wall section tends to be affected by light and heat inside the vehicle, and therefore the physical properties and appearance of the casing is deteriorated with time.

In view of these problems, it will be supposed to form a decorative protecting layer or coating film at the surface of the casing. However, in case of using a polyolefin material as the material of the casing for storing an airbag, a so-called two-coat and two-bake manner or a so-called two-coat and one-bake manner are necessary to rigidly bond the coating film to the surface of the casing, thus increasing a production cost. In the two-coat and two-bake manner, a primer is first coated and dried, and thereafter a paint is coated and dried. In the two-coat and one-bake manner, a primer is coated, and then a paint is coated and dried.

Figure 1:
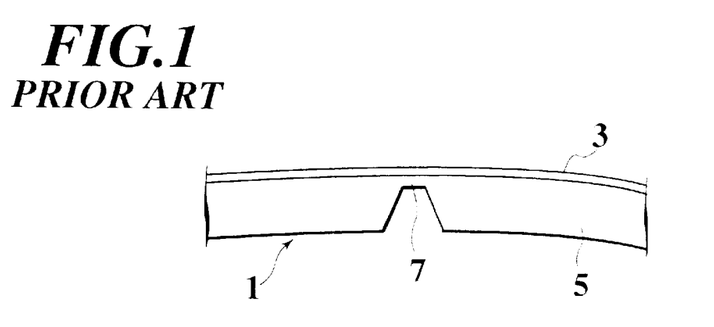
FIG. 1 is a fragmentary sectional view showing a conventional airbag storing casing in which a paint is coated on the surface of the airbag storing casing main body.

In order to solve the above-discussed difficulties encountered in painting processes, the present inventors have proposed new materials for the airbag storing casing and for the coating film, suitable for a so-called one-coat and one-bake manner in which a paint is coated and dried, as disclosed in Japanese Patent Laid-Open No. 6-156178 and Japanese Patent Laid-Open No. 8-324371. In this type of airbag storing casings, as shown in FIG. 1, the airbag storing casing 1 has a coating 3 which is applied onto the main body 5 and the coating can inhibit the thin wall portion 7 at which the casing 1 is torn from being deteriorated with time. According to these proposals, an airbag storing casing which has good appearance and which can be torn surely even in a condition of low temperatures.

However, the process for preparing the paint and forming a surface layer for decoration and protection becomes troublesome, thereby increasing a production cost. Accordingly, an effort to lower the production cost becomes necessary.

SUMMARY OF THE INVENTION

With these problems in mind, it is therefore an object of the present invention to provide an improved airbag storing casing which can overcome drawbacks encountered in conventional airbag storing casings and suitably function so as to securely store an airbag therein and to effectively tear along predetermined lines and smoothly deploy when the airbag is inflated to protect vehicle occupant, having a single-layer structure without use of reinforcing insert.

It is another object of the present invention to provide an improved airbag storing casing which is possible, without a surface layer or a coat, to reduce deterioration of physical properties and appearance due to aging or exposure to ultraviolet light, so as to retain suitable conditions and ensure a smooth deployment of the airbag storing casing.

In order to achieve the above-mentioned object, a casing for storing an airbag for an airbag restraint system, according to the present invention, comprises: a main body formed of a material comprising a thermoplastic elastomer composition which is prepared by: mixing 100 parts by weight of a copolymer composition with 0.05 to 0.5 parts by weight of a higher fatty acid amide as a lubricant to obtain a mixture; and dynamically heat-treating the mixture in the presence of an organic peroxide and an auxiliary crosslinking agent, wherein the copolymer composition comprises: (A) 20 to 50 parts by weight of an olefin copolymer resin of propylene and one or two kinds of 1-olefin other than propylene; (B) 10 to 50 parts by weight of ethylene-propylene copolymer rubber having a Mooney viscosity ($ML_{1+4}$, 100° C.) ranging from 30 to 60; (C) 10 to 70 parts by weight of ethylene-propylene-nonconjugated diene copolymer rubber having a Mooney viscosity ($ML_{1+4}$, 100° C.) ranging from 50 to 100; and (D) 10 to 50 parts by weight of an oil-extended ethylene-propylene-nonconjugated diene copolymer rubber containing ethylene-propylene-nonconjugated diene copolymer having a Mooney viscosity ($ML_{1+4}$, 100° C.) ranging from 150 to 350 and a mineral oil softener contained at an amount of 50 to 150 parts by weight relative to 100 parts by weight of the ethylene-propylene-nonconjugated diene copolymer.

According to the present invention provided also is a casing for storing an airbag of an airbag restraint system, comprising: a main body formed of a material comprising a partially crosslinked product from a mixture of 100 parts by weight of a copolymer composition and 0.05 to 0.5 parts by weight of a lubricant comprising higher fatty acid amide, with an organic peroxide for crosslinking the copolymer composition and an auxiliary crosslinking agent, wherein the copolymer composition comprises: (A) 20 to 50 parts by weight of an olefin copolymer resin containing a propylene moiety and a 1-olefin moiety other than propylene; (B) 10 to 50 parts by weight of ethylene-propylene copolymer rubber having a Mooney viscosity ($ML_{1+4}$, 100° C.) ranging from 30 to 60; (C) 10 to 70 parts by weight of ethylene-propylene-nonconjugated diene copolymer rubber having a Mooney viscosity ($ML_{1+4}$, 100° C.) ranging from 50 to 100; and (D) 10 to 50 parts by weight of an oil-extended ethylene-propylene-nonconjugated diene copolymer rubber comprising 100 parts by weight of ethylene-propylene-nonconjugated diene copolymer having a Mooney viscosity ($ML_{1+4}$, 100° C.) ranging from 150 to 350, and 50 to 150 parts by weight of a mineral oil softener.

BRIEF DESCRIPTION OF THE DRAWINGS

The features and advantages of the airbag storing casing according to the present invention over the prior art casings will be more clearly understood from the following description of the preferred embodiments of the present invention taken in conjunction with the accompanying drawings in which like reference numerals designate the same or similar elements or sections throughout the figures thereof and in which.

DETAILED DESCRIPTION OF THE PREFERRED EMBODIMENTS

The inventors of the present invention have conducted eager studies on materials of the airbag storing casing of the single layer structure, and, as a result, they have found an effective composition as the material of the airbag storing casing having a simple structure and improved properties so that the casing has a beautiful appearance and durability to aging, without coating, thus establishing the principle of the present invention. According to the present invention, the airbag storing casing manufactured in the resin molding step can be directly led into the airbag module assembling step, without formation of a decorating and protecting layer.

According to the present invention, the casing for storing an airbag for an airbag restraint system, comprises a main body formed of a material comprising a thermoplastic elastomer composition which is prepared by: mixing 100 parts by weight of a copolymer composition with 0.05 to 0.5 parts by weight of a lubricant comprising higher fatty acid amide to obtain a mixture; and dynamically heat-treating the mixture in the presence of an organic peroxide and an auxiliary crosslinking agent. The copolymer composition used for preparation of the thermoplastic elastomer composition contains: (A) 20 to 50 parts by weight of an olefin copolymer resin containing propylene and one or two kinds of 1-olefin other than propylene; (B) 10 to 50 parts by weight of ethylene-propylene copolymer rubber having a Mooney viscosity ($ML_{1+4}$, 100° C.) ranging from 30 to 60; (C) 10 to 70 parts by weight of ethylene-propylene-nonconjugated diene copolymer rubber having a Mooney viscosity ($ML_{1+4}$, 100° C.) ranging from 50 to 100; and (D) 10 to 50 parts by weight of an oil-extended ethylene-propylene-nonconjugated diene copolymer rubber containing ethylene-propylene-nonconjugated diene copolymer having a Mooney viscosity ($ML_{1+4}$, 100° C.) ranging from 150 to 350 and a mineral oil softener contained at an amount of 50 to 150 parts by weight relative to 100 parts by weight of the ethylene-propylene-nonconjugated diene copolymer.

In the airbag storing casing of the present invention, it is to be noted that the material or the thermoplastic elastomer composition is prepared by dynamically heat-treating the mixture. Good appearance of the airbag storing casing is exhibited by using characteristics of the obtained material, and the present invention should not be limited by structural factors, etc.

The material used for manufacturing the main body of the airbag storing casing for storing an airbag for an airbag restraint system according to the present invention will now be described in detail.

The olefin copolymer resin (A) is a copolymer of propylene and one or two kinds of 1-olefin other than propylene, and it may be random copolymer or block copolymer. Example of the 1-olefin include ethylene, 1-butene, 1-pentene, 1-hexene, 1-decene, 1-octene and the like. Of these, ethylene is preferable.

The copolymer for the olefin polymer resin (A) has a Melt Flow Rate ranging from 0.1 to 100 g/10 min. and preferably ranging from 0.5 to 50 g/10 min. If the Melt Flow Rate is lower than 0.1 g/10 min. or higher than 100 g/10 min., problems will arise in a processing characteristics. Here, it is to be noted that the Melt Flow Rate is a flow rate (g/10 min.) of a resin (kept at 230° C.) flowing through a hole (diameter: 2.0955 mm, axial length: 8 mm) formed in a die under a load of 2.16 kg, and it is determined according to Japanese Industrial Standard K 7210. The olefin copolymer resin (A) composed of the copolymer as described above is melted at a temperature of 130 to 165° C.

The ethylene-propylene copolymer rubber (B) has a Mooney viscosity ($ML_{1+4}$, 100° C.) ranging from 30 to 60, preferably ranging from 40 to 55, and the content of propylene moiety is from 10 to 55% by weight, and preferably, from 20 to 55% by weight. If the Mooney viscosity exceeds 60, flowability of the material is deteriorated, resulting in inferior appearance of the product. On the contrary, if the Mooney viscosity is less than 30, gloss of the surface is undesirably intensified to deteriorate the appearance and the molded product has increased tackiness at the surface thereof. If the content of propylene moiety is less than 10% by weight or more than 55% by weight, problems will arise in impact strength at a low temperature of the material.

The ethylene-propylene-nonconjugated diene copolymer rubber (C) has a Mooney viscosity ($ML_{1+4}$, 100° C.) ranging from 50 to 100, preferably ranging from 70 to 90. Examples of the nonconjugated diene include dicyclopentadiene, 1,4-hexadiene, cyclooctadiene, methylene norbornene, ethylidene norbornene and the like, and in particular, dicyclopentadiene and ethylidene norbornene are preferable.

As a specific example given is an ethylene-propylene-cyclopentadiene copolymer rubber in which the content of propylene is from 10 to 55% by weight, preferably from 30 to 55% by weight, and the content of dicyclopentadiene is from 1 to 30% by weight, preferably from 3 to 20% by weight. If the Mooney viscosity is less than 50, strength, especially impact strength at a low temperature, of the material becomes insufficient. If the Mooney viscosity exceeds 100, fabrication and processing characteristics, particularly flowability of the material is deteriorated. If the propylene content is less than 10% by weight or more than 55% by weight, problems will arise in impact strength at a low temperature of the material.

In regard to the oil-extended copolymer rubber (D), the ethylene-propylene-nonconjugated diene copolymer contained therein has a Mooney viscosity ($ML_{1+4}$, 100° C.) ranging from 150 to 350, preferably ranging from 200 to 300, in the absence of the mineral oil softener. Examples of nonconjugated diene include dicyclopentadiene, 1,4-hexadiene, cyclooctadiene, methylene norbornene, ethylidene norbornene and the like. Among these examples, dicyclopentadiene and ethylidene norbornene are particularly preferable. The mineral oil softener is used at a ratio of 50 to 150 parts by weight relative to 100 parts of ethylene-propylene-nonconjugated diene copolymer. If the propylene content of the ethylene-propylene-nonconjugated diene copolymer is less than 10% by weight or exceeds 55% by weight, problems will arise in impact strength at a low temperature of the material.

As a specific example of the ethylene-propylene-nonconjugated diene copolymer given is an ethylene-propylene-ethylidene norbornene copolymer rubber in which the content of propylene is from 10 to 55% by weight, preferably from 20 to 55% by weight, and the content of ethylidene norbornene is from 1 to 30% by weight, preferably from 2 to 20% by weight. If the Mooney viscosity is less than 150, the oil softener is incompletely held in the copolymer rubber. Therefore, it tends to separate out and mar the surface of the material, resulting in poor appearance. If the Mooney viscosity exceeds 350, processability is deteriorated and particularly, flowability of the material falls. If the content of the mineral oil softener is less than 50 parts by weight, flowability of the rubber is deficient and problems will arise in processability. If the content of the mineral oil softener is more than 150 parts by weight, the oil softener separates out and mar the surface of the material to deteriorate the appearance.

The mineral oil softener is a high boiling point petroleum fraction which is used for the purpose of improving a processability and mechanical properties of the rubber mainly to get softer characteristics. Examples of the mineral oil include oils of paraffin, naphthene and aromatic, and the paraffinic oil is preferable.

The above components (A), (B), (C) and (D) are blended to prepare the copolymer composition with the above-described composition ratio, and 100 parts by weight of the obtained copolymer composition is mixed with a lubricant in an amount of preferably 0.05 to 0.5 parts by weight. For the lubricant, higher fatty acid amide such as oleamide, erucamide or the like is usable. If the amount of the lubricant is less than the minimum limit of the above range, mold release characteristics of the obtained thermoplastic elastomer composition deteriorates and the surface of the molded product has such poor slidability that may be easily damaged. If the amount of the lubricant exceeds the maximum limit of the above-described range, the excess amount of the lubricant evaporates to fog the window of vehicles and causes blooming on the surface of the molded product to mar the appearance.

The obtained mixture containing (A) an olefin copolymer resin, (B) an ethylene-propylene copolymer rubber, (C) an ethylene-propylene-nonconjugated diene copolymer rubber, (D) an oil-extended ethylene-propylene-nonconjugated diene copolymer rubber and a higher fatty acid amide is dynamically heat-treated in the presence of an organic peroxide and an auxiliary crosslinking agent, and the mixture is thereby partially crosslinked to produce a thermoplastic elastomer composition which is suitable for fabrication of the main body of the airbag storing casing.

The dynamic heat treatment specifically means melting and kneading the mixture with application of heat. It is preferable that the kneading is carried out at a temperature ranging from 150 to 300° C. and for a treatment time ranging from about 1 to 30 minutes. A conventional and known closed type Banbury mixer, a twin screw kneader and the like are usable as a kneading apparatus for performing the dynamic heat treatment. However, it should not be limited and any operation which can produce substantially the same effect on the mixture is applicable.

Examples of the organic peroxide, which is used for partially crosslinking the components of the mixture, includes 2,5-dimethyl-2,5-di(t-butylperoxy)hexane, 2,5-dimethyl-2,5-di(t-butylperoxy)-3-hexyne, 1,3-bis[(t-butylperoxy)isopropyl]benzen, 1,1-di(t-butylperoxy)-3,5,5-trimethylcyclohexane, 2,5-dimethyl-2,5-di[(t-butylperoxy)benzoyl]-3-hexyne, di-α-cumyl peroxide and the like. Among these peroxides, 2,5-dimethyl-2,5-bis(t-butylperoxy)hexane is preferable particularly from the view points of odor characteristics and scorching characteristics.

The amount of the added organic peroxide is selected preferably within a range of from 0.005 to 2.0 parts by weight, most suitably within a range of 0.01 to 0.6, relative to 100 parts by weight of total of the olefin resin, the ethylene-propylene copolymer rubber, the ethylene-propylene-nonconjugated diene copolymer rubber and the oil-extended ethylene-propylene-nonconjugated diene. If the added amount is less than 0.005 parts by weight, the effect of crosslinking reaction is small. If the added amount exceeds 2.0 parts by weight, controlling the reaction is difficult and besides providing economical disadvantages.

In production of the thermoplastic copolymer composition, an auxiliary crosslinking agent can be used to promote the formation of the partial crosslinking or bridge structure under the organic peroxide. Examples of the auxiliary crosslinking agent include: vulcanizing agents and vulcanizing accelerators such as N,N'-m-phenylene bismaleimide, toluylene bismaleimide, p-quinonedioxime, diphenyl guanidine and the like; polyfunctional vinyl onomers such as divinylbenzene, ethylene glycol dimethacrylate, polyethylene glycol dimethacrylate, trimethylol propane trimethacrylate, allyl methacrylate and the like.

In preparation of the thermoplastic elastomer composition described above, auxiliary materials such as an inorganic filler(s), an antioxidant(s), an light registing agent(s) and a coloring pigment(s) can be mixed with the main components.

The material or the elastomer composition comprising the above-described components is high in so-called toughness and excellent in light resistance and heat aging resistance, and it has prominent impact resistance that does not substantially deteriorate throughout a wide temperature range from high to low temperatures and good appearance which does not have undesirable sparkle or uneven luster. It also has resistance to damage. Accordingly, the airbag storing casing of the present invention formed by fabricating this composition is allowed to tear only along predetermined tearing lines and develop so as to cause the airbag to smoothly inflate in a direction predetermined according to a design when the airbag is operated, although the airbag storing casing is of the single layer structure. Thus, the most basic performance required for an airbag storing casing can be satisfied by the airbag storing casing formed of the material according to the present invention.

The fabrication method of the main body of the airbag storing casing of the above-described single layer structure is not particularly limited, and therefore usual or general fabrication methods such as injection molding, transfer molding, press molding (or stamping) and the like can be used for the main body of the airbag storing casing. Of these manners, injection molding is particularly preferable.

When the material is molded to form the casing main body, it is preferred to use a mold having a side gate so as to fill the material at a high speed and reduce pressure loss. Moreover, in view of uniform luster and improvement of appearance, the temperature of the mold at the cavity face is preferably ranged from 20° C. to 45° C. so as to prevent the resin from being cooled rapidly after being injected into the mold.

Figure 2:
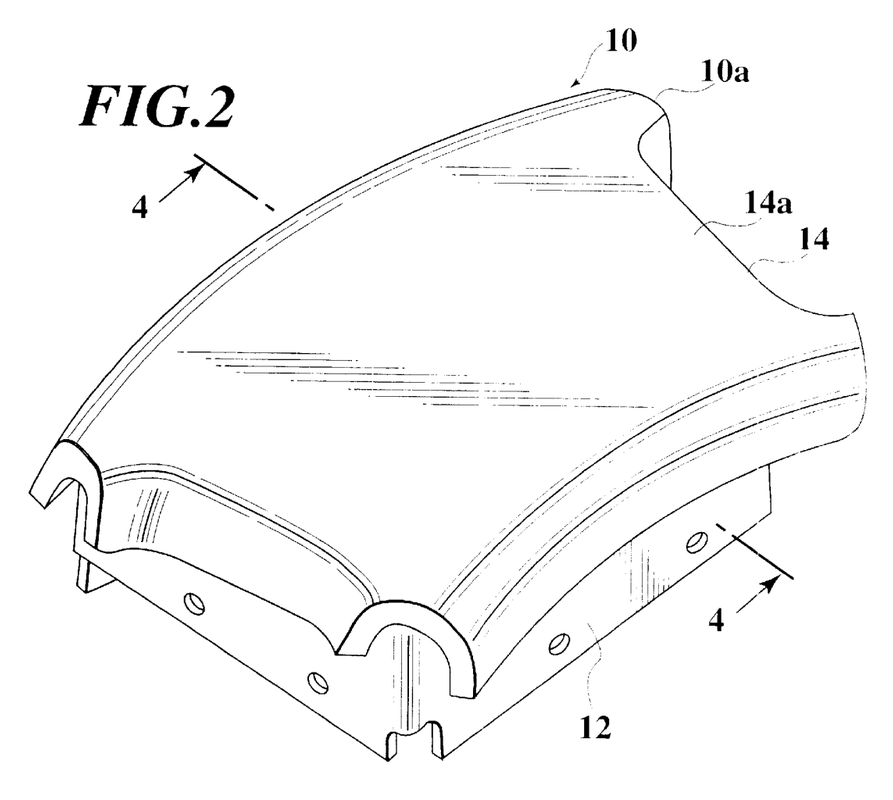
FIG. 2 is a perspective view of a main body of an embodiment of an airbag storing casing in accordance with the present invention, as viewed from an above direction.
Figure 3:
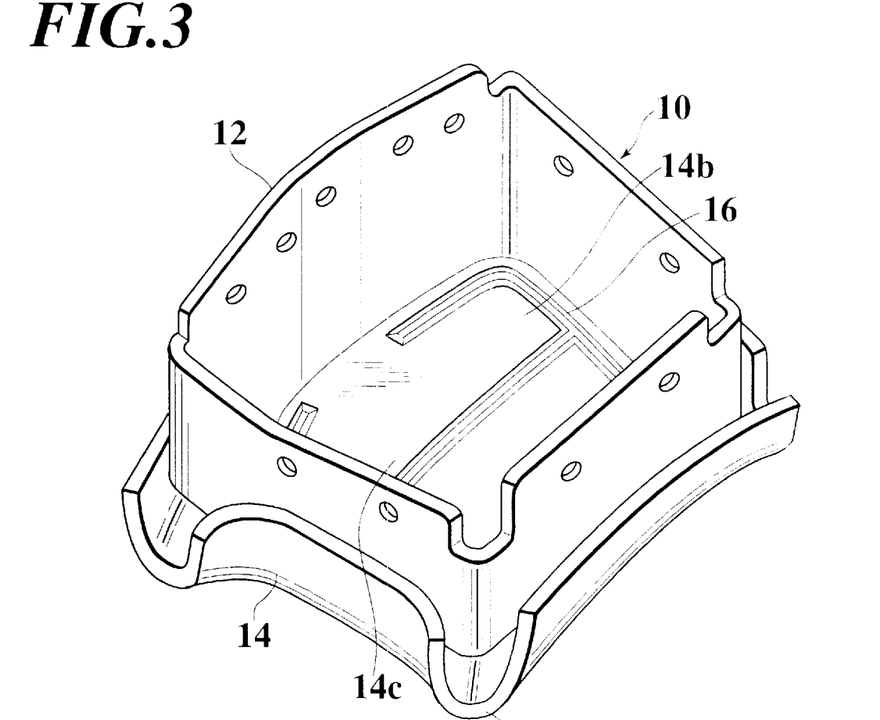
FIG. 3 is a perspective view of the airbag storing casing main body of FIG. 2 but as viewed from an under direction.
Figure 4:
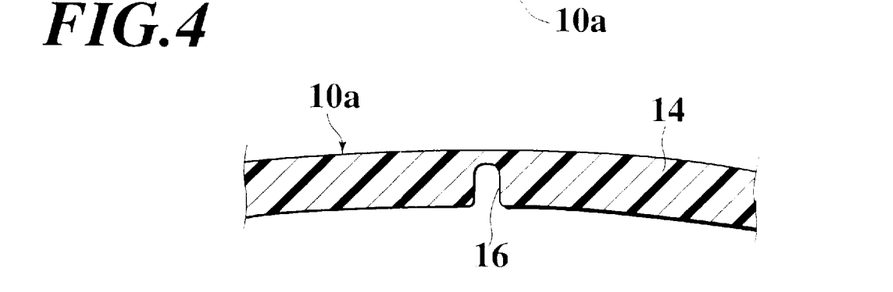
FIG. 4 is a fragmentary sectional view taken in the direction of arrows substantially along the line of 4—4 of FIG. 2.

A preferred embodiment of the airbag storing casing which is fabricated with the above-described thermoplastic elastomer composition is shown in FIGS. 2 to 4. The airbag storing casing 10 comprises a main body 10a which is nearly cup-shaped and usually installed to a base member (not shown) within a passenger compartment of an automotive vehicle, in the state of FIG. 2. More specifically, the main body 10a of the airbag storing casing 10 includes a tube-like portion 12 having a generally rectangular cross-section and a top lid-like portion 14. The tube-like portion 12 which is to be fixedly attached to a base member of an airbag module is integral with the top lid-like portion 14. The top lid-like portion 14 has a top flat surface 14a which faces a vehicle occupant (not shown). It will be easily understood that an inflatable airbag (not shown) is stored in its folded state inside the main body 10a of the airbag storing casing 10. As shown in FIG. 3, the lid-like portion 14 has grooves 16 which are formed on the inner surface 14b of the lid-like portion to form thin wall portions in the lid-like portion 14. The airbag storing casing 10 tears along the grooves 16 into door portions 14c which allows the airbag to project out toward the vehicle occupant when the airbag is inflated under operation of an airbag restraint system.

As described above, the lid-like portion 14 comprises: the thin wall portions at which the grooves 16 are provided on the lid-like portion 14; and door portions 14c which are made by tearing the top lid-like portion 14 along the grooves 16. In order to present better appearance, it is effective to form eggshell texture (i.e. fine unevenness or emboss of the product surface) on the top flat surface 14a of the lid-like portion 14. Such texture is formed with depth (difference between the top and the bottom) of at least 80 $\mu$m, preferably depth ranging from 110 to 140 $\mu$m. If the depth of the texture is less than 80 $\mu$m, it may not exhibit an improve effect of making uniform delustering or appropriate gloss on the surface appearance. If the depth of the texture exceeds 160 $\mu$m, it gives poor appearance that is unsuitable for airbag storing casings. Therefore, the maximum depth of the texture is appropriately 160 $\mu$m.

One of general manners for embossing or forming a texture on the surface of the molded product is to provide a corresponding pattern on the inner surface of the cavity of the mold to produce the molded product, and the general manners like this are usable in the present invention for making the texture on the molded product as described above. In order to form a texture which can present more appropriate gloss (luster) and better appearance on the surface of the product as described above, it is effective, for example, to use a mold in which fine glass beads are blown onto the inner surface of the cavity to make fine unevenness on that surface.

EXAMPLES

The present invention will be described in more detail with reference to examples and comparative examples.

Preparation of Material for Molding Airbag Storing Casing and Manufacture of Airbag Storing Casing Example 1

Into a Banbury mixer poured are: 26 parts by weight of propylene-ethylene random copolymer resin having a Melt Flow Rate of 60 g/10 min. and an ethylene content of 3.2% by weight; 16 parts by weight of propylene-ethylene block copolymer resin having a Melt Flow Rate of 20 g/10 min. and consisting of 12.5% by weight of propylene-ethylene random copolymer moiety having an ethylene content of 40% by weight and the balance amount of propylene homopolymer moiety; 17.8 parts by weight of ethylene-propylene copolymer rubber with a Mooney viscosity ($ML_{1+4}$, 100° C.) of 52 and a propylene content of 27% by weight; 25.6 parts by weight of ethylene-propylene-dicyclopentadiene copolymer rubber with a Mooney viscosity ($ML_{1+4}$, 100° C.) of 85, a propylene content of 50% by weight and a content of dicycropentadiene of 4% by weight; and 15 parts by weight of an oil-extended ethylene-propylene-ethylidene norbornene copolymer rubber having a Mooney viscosity ($ML_{1+4}$, 100° C.) of 242, a propylene content of 28% by weight, a content of ethylidene norbornene being 2.75% by weight and containing 50% by weight of paraffin processing oil having an average molecular weight of 746. Moreover, relative to 100 parts by weight of the total of the above components, 0.1 part by weight oleamide, 0.1 part by weight erucamide and 0.2 parts by weight N,N'-m-phenylene-bismaleimide were added, and mixing and melting were made for 12 minutes. The temperature of the mixture at the time of finishing the dynamic heat-treatment was about 180° C. Then the mixture was subjected to pelletization by using a monoaxial pelletizing apparatus, thereby obtaining pellet-like mixture.

Next, 100 parts by weight of the above pellet-like mixture was mixed with 0.1 part by weight of 2,5-dimethyl-2,5-bis (t-butylperoxy)hexane in a tumbler, and this mixture was melted and kneaded at a temperature of 210° C. for one to two minutes by using a twin-screw extruder, as dynamic thermal treatment, to obtain thermoplastic elastomer pellets.

For injection molding prepared was a metallic die having a side gate in which section of the flow passage had a dimension of 4.0 mm width×1.5 mm thickness and having a pattern on the inner surface of the cavity for embossing the outside surface of the molded product. Using the above die, the above thermoplastic elastomer pellets were subjected to injection molding at a molding temperature of 230° C., at an injection pressure of 770 kg/cm$^2$, and at a metallic die temperature of 20 to 45° C. so that the thermoplastic elastomer of an amount corresponding to 95% by weight of the product was injected into the mold in 1.5 seconds from the start of injection, followed with an amount corresponding to the remaining 5% by weight injected slowly in next 15 seconds.

As a result of the above preparation, an airbag storing casing as shown in FIGS. 2 to 4 was obtained, in which the outside surface was embossed at a depth of 120 $\mu$m. Any uneven gloss or sink mark had not been found on the surface of the casing, even in the vicinity of the grooves 16 at which the casing was to be torn. Therefore, the appearance of the casing product was sufficient without a top coat applied after molding.

Example 2

The procedures of Example 1 were repeated, excepting that, instead of the die used in Example 1, another die having a finer pattern was used. As a result, an airbag storing casing as shown in FIGS. 2 to 4 was similarly obtained, in which the outside surface was embossed at a depth of 80 μm.

In the above casing, any difference in gloss had not been found on the surface between the thin wall portion in the vicinity of the grooves 16 at which the casing was to be torn and the other portions. Therefore, the appearance of the product was sufficient without a top coat applied after molding.

Example 3

The procedures of Example 1 were repeated, excepting that, instead of the die used in Example 1, another die having a coarse pattern was used. As a result, an airbag storing casing as shown in FIGS. 2 to 4 was similarly obtained, in which the outside surface was embossed at a depth of 180 μm.

In the above casing, any difference in gloss had not been found on the surface between the thin wall portion in the vicinity of the grooves 16 and the other portions. Therefore, the appearance of the product was sufficient without application of a top coat performed after molding.

Comparative Example 1

Following is an example of an airbag storing casing which was manufactured by so-called one-coat one-bake process and which had a protective coat layer.

Melting and mixing were made in a Banbury mixer for 12 minutes to dynamically heat-treat a mixture of 100 parts by weight of ethylene-propylene-dicyclopentadiene copolymer rubber having a Mooney viscosity ($ML_{1+4}$, 100° C.) of 85, a propylene content of 50% by weight and a dicyclopentadiene content of 4% by weight, 25 parts by weight of homogenized polypropylene having a Melt Flow Rate of 10 g/10 min. and 0.4 parts by weight of 2,5-dimethyl-2,5-di(t-butylperoxy)hexane. Thereafter, 37.5 parts by weight of paraffinic process oil (the trade name "Diana Process Oil PW380" produced by Idemitu Kosan Co., Ltd.) was added to the dynamically heat-treated mixture and subjected to pelletization, thereby obtaining pellet-like thermoplastic elastomers. The temperature of the mixture at the time of finishing the dynamic heat-treatment was about 180° C.

Figure 5:
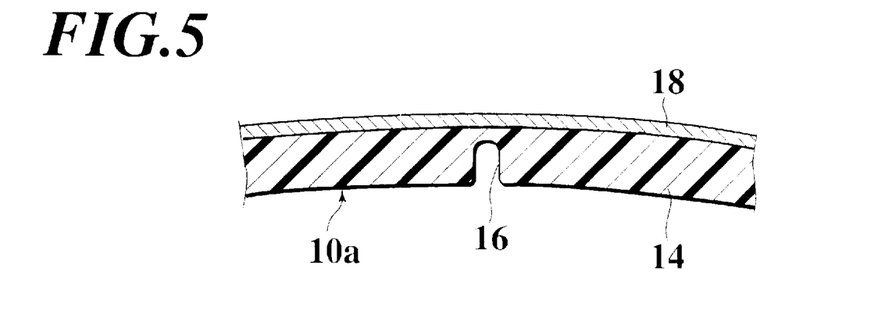
FIG. 5 is a fragmentary sectional view similar to FIG. 4 but showing a comparative example in which a paint is coated on the surface of an airbag storing casing main body.

The composition obtained above was subjected to injection molding at a molding temperature of 180 to 220° C., at an injection pressure of 500 to 1000 kg/cm$^2$, at a metallic die temperature of 20 to 50° C., for a cooling time of 30 to 50 sec., and for an injection time of 7 to 12 sec., thereby forming a main body 10a of an airbag storing casing as shown in FIG. 5.

In the above injection molding, the die used for forming the airbag storing casing had a pattern on the inner surface of the cavity, so that the molded product was embossed on the outside surface of the top lid-like portion 14 of the main body 10a to give a realistic impression of leather at depths of 80 to 115 μm. In this casing, difference in gloss (uneven luster) had been found at the thin wall portion in the vicinity of the grooves 16, which could be recognized from the surrounding portions by visual check. However, it had smooth surfaces with no sink mark.

Next, a paint was prepared in a method as set forth below. First, a main resinous ingredient was prepared by mixing the following components:

| | |
|---|---|
| (Resin components) | |
| Chlorinated polyolefin resin (the trade name "Superchlon 892L" produced by Sanyo Kokusaku Pulp Co.) | 17.0 wt % |
| Polytetramthylene glycol resin (the trade name "PTMG-1000" produced by Mitsubishi Chemical Industries Ltc.) | 5.0 wt % |
| Epoxy resin (the trade name "Epikote 834" produced by Yuka Shell Epoxy Kabushiki Kaisha) | 1.0 wt % |
| (Solvent components) | |
| Toluene | 65.0 wt % |
| Xylene | 3.5 wt % |
| Methylethyl ketone | 1 0 wt % |
| (Pigment) | |
| Carbon black | 3.0 wt % |
| (Gloss adjusting agent) | |
| Silica fine powder | 2.0 wt % |
| (Modifier) | |
| Alcohol-modified silicone (the trade name "8428" produced by Toray Dow Corning Silicone) | 1.0 wt % |
| (Stabilizer) | |
| Magnesium compound (the trade name "TS-880" produced by Akishima Chemical Industries Co., Ltd.) | 0.5 wt % |
| (Light resisting agent) | |
| Hindered amine | 1.0 wt % |

To 100 parts by weight of the main resinous ingredient consisting of the above components, 10 parts by weight of a hardener was added. The hardener consisted of 29.5% by weight of an addition polymer (the trade name "Duranate E402-90T" produced by Asahi Chemical Industries Co., Ltd.) of hexamethylene diisocyanate and polyester polyol, 19.6% by weight of hexamethylene diisocyanate (the trade name "N-75" produced by Sumitomo Bayer Urethane Co., Ltd.) and 50.9% by weight of ethyl acetate. Furthermore, 80 parts by weight of a mixture consisting of 40% by weight of methylcyclohexane, 20% by weight of methylisobutyl ketone, 20% by weight of xylene, 10% by weight of cyclohexanone and 10% by weight of methoxypropyl acetate was added as a diluent. Thus the paint to be used for the main body of the airbag storing casing was prepared.

The paint was coated on the surface of the main body of the airbag storing casing which had been fabricated as described above. Then, the paint was dried at 80° C. for 30 minutes, thereby forming a coated film 18 having a thickness of 25 μm in a dried state, as shown in FIG. 5. The uneven luster found on the thin wall portion in the vicinity of the grooves 16 disappeared with the coated film which worked as a decorating and protecting layer.

Comparative Example 2

The procedures of Comparative Example 1 were repeated, excepting that, the paint was not coated on the main body of the airbag storing casing. As a result, an airbag storing casing as shown in FIGS. 2 to 4 was obtained, in which the outside surface was embossed at a depth of 80 to 15 μm.

Evaluation of Airbag Storing Casing

In each of Examples 1 to 3 and Comparative Examples, sing an arbitrary airbag storing casing, the performance thereof was evaluated about the following properties.

(Appearance)

For each casing, it was checked under visual observation whether nonuniformity was recognized or not. The results are shown in Table 1.

"Excel": Not recognized.
"Moder.": Recognized.

(Impact Resistance)

For each casing, it was check whether cracking was recognized or not, under a test with a Du Pont Impact Tester at ordinary temperature (20° C.), −20° C., −30° C. and −40° C. The results are shown in Table 1.

"Excel": No cracking was recognized under the tests.
"Aver.": Cracking was recognized under the tests.

It is to be noted that the test with the Du Pont Impact Tester was made according to Japanese Industrial Standard K-5400, by dropping a weight of 500 g onto an impact member in contact with the surface of the casing from a height of 50 cm, in which a tip end of the impact member had a diameter of 12.7 mm.

(Moisture Resistance)

For each casing, it was checked whether chalking or gross change was recognized or not, after the casing was allowed to stand at 40° C. for 120 hours in the atmosphere of a humidity of 99%, and at 50° C. for 1,000 hours in the atmosphere of a humidity of 95%. The results are shown in Table 1.

"Excel": None of the above was recognized.
"Aver.": Either of the above was recognized.

(Heat Resistance)

For each casing, it was checked whether color change or remarkable gloss change was recognized or not, after the casing was allowed to stand at 100° C. for 1,000 hours, at 110° C. for 300 hours and 1,000 hours, and at 120° C. for 1,000 hours. The results are shown in Table 1.

"Excel": None of the above was recognized.
"Aver.": Either of the above was recognized.

(Scratch Resistance)

For each casing, scratching was made on the surface thereof by using a Taber scratch test machine (produced by Yasuda Seiki Seisakusho Ltd. of Japan) under loads of 500 g, 600 g and 700 g. Then it was visually observed whether any damage upon being scratched was recognized on the surface or not. The results are shown in Table 1.

"Excel": Damage was not recognized.
"Good": Damage was recognized.
"Moder.": Remarkable damage was recognized.

(Light Resistance in Appearance)

For each casing, it was checked whether color change was recognized or not, after the casing was allowed to stand in ultraviolet radiation for 600 hours by a sunshine weatherometer. The results are shown in Table 1.

"Excel": Color change was not recognized.
"Moder.": Color change was recognized.
"Aver.": Remarkable color change was recognized.

(Light Resistance in Physical Properties)

In each of Examples 1 to 3 and Comparative Examples 1 and 2, the following procedures were performed.

First, the airbag storing casings were led into the airbag module assembling step to obtain airbag modules enclosing an airbag and an airbag restraint system.

Next, one of the airbag modules was subjected to a developing test by inflating the airbag, while formation of doors by tearing of the airbag storing casing was observed.

Moreover, another airbag module was allowed to stand in ultraviolet radiation for 1,000 hours by a sunshine weatherometer. Thereafter, the airbag module was similarly subjected to the developing test, observing the formation of doors. Then it was checked whether difference in formation of doors was recognized or not. The results are shown in Table 1.

"Excel": Difference was not recognized.
"Aver.": Difference was recognized.

TABLE 1

|  | Example | | | Comparative Example | |
| --- | --- | --- | --- | --- | --- |
|  | 1 | 2 | 3 | 1 | 2 |
| Appearance | Excel | Excel | Excel | Excel | Moder. |
| Impact, Resistance | | | | | |
| +20° C. | Excel | Excel | Excel | Excel | Excel |
| −20° C. | Excel | Excel | Excel | Excel | Excel |
| −30° C. | Excel | Excel | Excel | Excel | Excel |
| −40° C. | Excel | Excel | Excel | Excel | Excel |
| Moisture Resistance | | | | | |
| 40° C., 99% RH, 120 hrs | Excel | Excel | Excel | Excel | Excel |
| 50° C., 95% RH, 1000 hrs | Excel | Excel | Excel | Excel | Excel |
| Heat Resistance | | | | | |
| 100° C., 1000 hrs | Excel | Excel | Excel | Excel | Excel |
| 110° C., 300 hrs | Excel | Excel | Excel | Excel | Excel |
| 110° C., 1000 hrs | Excel | Excel | Excel | Excel | Excel |
| 120° C., 1000 hrs | Excel | Excel | Excel | Excel | Excel |
| Scratch Resistance | | | | | |
| 500 g | Excel | Excel | Excel | Excel | Excel |
| 600 g | Excel | Excel | Excel | Excel | Good |
| 700 g | Excel | Excel | Excel | Good | Moder. |
| Light Resistance in Appearance | Excel | Excel | Excel | Excel | Moder.-Aver. |
| Light Resistance in Physical Properties | Excel | Excel | Excel | Excel | Excel |

In the test of light resistance for Comparative Example 2, it was also recognized that the gloss of the entire casing was increased after the irradiation as well as non-uniformity or difference in gloss.

As clear from the above results, the airbag storing casing of each of Examples 1 to 3 according to the present invention has beautiful appearance so that difference in gloss is not seen between the thin wall portion and the other thick portions, and the appearance has resistance to ultraviolet radiation, respectively, irrespective of the depth of emboss.

In contrast to the above, though the airbag storing casing having a coat of Comparative Example 1 has good appearance and resistance to light, it has a trouble in scratch resistance with a heavier load. The airbag storing casing of Comparative Example 2, which corresponds to a casing which is omitted the coat from that of Comparative Example 1, is inferior in scratch resistance and light resistance to the other casings above.

As mentioned above, the airbag storing casing constructed as above according to the present invention gives sufficient performance which is brought by the particular combination of the materials, without provision of a decorative protection layer.

Accordingly, it is possible to omit the step of forming the decorative protection layer, and the molding step for molding the airbag storing casing can be directly led to the assembling step for assembling an airbag module. Therefore, it is possible to rationalize the manufacturing process and reduce the cost for manufacture.

Moreover, it is possible to omit the solvent and the like which are used in the formation of the decorative protection layer. As a result, the cost for purchasing and managing them, various apparatus for preventing the solvent from diffusing to the air and the cost for managing those apparatus can be omitted.

In addition, it is also possible to omit the step for baking the decorative protection layer. As a result, energy necessary for manufacture is reduced, and the manufacture of the airbag is released from heat treatment accompanied with troublesome thermal management and safety management.

As described above, the airbag storing casing of the present invention is prominent so that can be easily manufactured with good appearance, and the manufacturing process is simple with a low cost.

It must be understood that the invention is in no way limited to the above embodiments and that many changes may be brought about therein without departing from the scope of the invention as defined by the appended claims.

What is claimed is:

1. An airbag storing case for an airbag restraint system, comprising:
   a main body formed of a material comprising a thermoplastic elastomer composition in a single-layer structure and having a groove which makes the main body tear easily with expansion of the airbag, the thermoplastic elastomer composition being prepared by:
      mixing 100 parts by weight of a copolymer composition with 0.05 to 0.5 parts by weight of a lubricant comprising higher fatty acid amide to obtain a mixture; and
      dynamically heat-treating the mixture in the presence of an organic peroxide and an auxiliary crosslinking agent,
   wherein the copolymer composition comprises:
      (A) 20 to 50 parts by weight of an olefin copolymer resin of propylene and one or two kinds of 1-olefin other than propylene;
      (B) 10 to 50 parts by weight of ethylene-propylene copolymer rubber having a Mooney viscosity ($ML_{1+4}$, 100° C.) ranging from 30 to 60;
      (C) 10 to 70 parts by weight of ethylene-propylene-nonconjugated diene copolymer rubber having a Mooney viscosity ($ML_{1+4}$, 100° C.) ranging from 50 to 100; and
      (D) 10 to 50 parts by weight of an oil-extended ethylene-propylene-nonconjugated diene copolymer rubber containing ethylene-propylene-nonconjugated diene copolymer having a Mooney viscosity ($ML_{1+4}$, 100° C.) ranging from 150 to 350 and a mineral oil softener contained at an amount of 50 to 150 parts by weight relative to 100 parts by weight of the ethylene-propylene-nonconjugated diene copolymer.

2. The casing of claim 1, wherein the higher fatty acid amide of the lubricant is oleamide or erucamide.

3. The casing of claim 1, wherein the amount of the organic peroxide is 0.005 to 2.0 parts by weight relative to 100 parts by weight of total of the olefin resin, the ethylene-propylene copolymer rubber, the ethylene-ropylene-nonconjugated diene copolymer rubber and the oil-extended ethylene-propylene-nonconjugated diene.

4. The casing of claim 1, wherein the amount of the organic peroxide is 0.01 to 0.6 parts by weight relative to 100 parts by weight of total of the olefin resin, the ethylene-propylene copolymer rubber, the ethylene-propylene-nonconjugated diene copolymer rubber and the oil-extended ethylene-propylene-nonconjugated diene, and the organic peroxide is selected from the group consisting of 2,5-dimethyl-2,5-di(t-butylperoxy)hexane, 2,5-dimethyl-2,5-di (t-butylperoxy)-3-hexyne, 1,3-bis[(t-butylperoxy)isopropyl] benzen, 1,1-di(t-butylperoxy)-3,5,5-trimethylcyclohexane, 2,5-dimethyl-2,5-di[(t-butylperoxy)benzoyl]-3-hexyne and di-α-cumyl peroxide.

5. The casing of claim 1, wherein the auxiliary crosslinking agent is selected from the group consisting of N,N'-m-phenylene bismaleimide, toluylene bismaleimide, p-quinonedioxime, 1,3-diphenyl guanidine, divinylbenzene, ethylene glycol dimethacrylate, polyethylene glycol dimethacrylate, trimethylol propane trimethacrylate and allyl methacrylate.

6. The casing of claim 1, wherein the 1-olefin of the olefin copolymer resin (A) is selected from the group consisting of ethylene, 1-butene, 1-pentene, 1-hexene, 1-decene and 1-octene.

7. The casing of claim 1, wherein the melting temperature of the olefin copolymer resin (A) is 130 to 165° C.

8. The casing of claim 1, wherein the olefin copolymer resin (A) has a Melt Flow Rate (230° C.) ranging from 0.5 to 50 g/10 min.

9. The casing of claim 1, wherein the ethylene-propylene copolymer rubber (B) contains 10 to 55% by weight of a propylene moiety.

10. The casing of claim 1, wherein the ethylene-propylene copolymer rubber (B) contains 20 to 55% by weight of a propylene moiety.

11. The casing of claim 1, wherein the ethylene-propylene-nonconjugated diene copolymer rubber (C) contains a nonconjugated diene moiety which is selected from the group consisting of dicyclopentadiene, 1,4-hexadiene, cyclooctadiene, methylene norbornene and ethylidene norbornene.

12. The casing of claim 11, wherein the ethylene-propylene-nonconjugated diene copolymer rubber (C) contains 10 to 55% by weight of a propylene moiety and 1 to 30% by weight of a nonconjugated diene moiety which is a dicyclopentadiene moiety.

13. The casing of claim 1, wherein the ethylene-propylene-nonconjugated diene copolymer of the oil-extended ethylene-propylene-nonconjugated diene copolymer rubber (D) contains a nonconjugated diene moiety which is selected from the group consisting of dicyclopentadiene, 1,4-hexadiene, cyclooctadiene, methylene norbornene and ethylidene norbornene.

14. The casing of claim 1, wherein the mineral oil softener of the oil-extended ethylene-propylene-nonconjugated diene copolymer rubber (D) is a high boiling point petroleum faction which is selected from the group consisting of paraffinic oil, naphthenic oil and aromatic oil.

15. The casing of claim 1, wherein the ethylene-propylene-nonconjugated diene copolymer of the oil-extended ethylene-propylene-nonconjugated diene copolymer rubber (D) contains 10 to 55% by weight of a propylene moiety and 1 to 30% by weight of a nonconjugated diene moiety which is a ethylidene norbornene moiety.

16. The casing of claim 1, wherein the main body has an outer surface with a surface texture formed at a depth between top and bottom of the texture of at least 80 $\mu$m.

17. The casing of claim 16, wherein the depth of the texture is within a range of 110 to 140 $\mu$m.

18. An airbag storing case for an airbag restraint system, comprising:
   a main body formed in a single-layer structure of a material comprising a partially crosslinked product from a mixture of 100 parts by weight of a copolymer composition and 0.05 to 0.5 parts by weight of a lubricant comprising higher fatty acid amide, with an organic peroxide for crosslinking the copolymer composition and an auxiliary crosslinking agent, and having a groove which makes the main body tear easily with expansion of the airbag, wherein the copolymer composition comprises:
- (A) 20 to 50 parts by weight of an olefin copolymer resin containing a propylene moiety and a 1-olefin moiety other than propylene;
- (B) 10 to 50 parts by weight of ethylene-propylene copolymer rubber having a Mooney viscosity ($ML_{1+4}$, 100° C.) ranging from 30 to 60;
- (C) 10 to 70 parts by weight of ethylene-propylene-nonconjugated diene copolymer rubber having a Mooney viscosity ($ML_{1+4}$, 100° C.) ranging from 50 to 100; and
- (D) 10 to 50 parts by weight of an oil-extended ethylene-propylene-nonconjugated diene copolymer rubber comprising 100 parts by weight of ethylene-propylene-nonconjugated diene copolymer having a Mooney viscosity ($ML_{1+4}$, 100° C.) ranging from 150 to 350, and 50 to 150 parts by weight of a mineral oil softener.

* * * * *